United States Patent
Oliver et al.

(10) Patent No.: US 9,436,929 B2
(45) Date of Patent: Sep. 6, 2016

(54) COLLABORATIVE EVENT PLAYLIST SYSTEMS AND METHODS

(75) Inventors: Michael R. Oliver, Hoboken, NJ (US); Brian F. Roberts, Dallas, TX (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 228 days.

(21) Appl. No.: 13/356,834

(22) Filed: Jan. 24, 2012

(65) Prior Publication Data

US 2013/0191454 A1 Jul. 25, 2013

(51) Int. Cl.
| | |
|---|---|
| G06F 15/16 | (2006.01) |
| G06Q 10/10 | (2012.01) |
| G06F 17/30 | (2006.01) |

(52) U.S. Cl.
CPC ......... *G06Q 10/10* (2013.01); *G06F 17/30772* (2013.01)

(58) Field of Classification Search
USPC ....................................................... 709/204
See application file for complete search history.

(56) References Cited

U.S. PATENT DOCUMENTS

| | | | | |
|---|---|---|---|---|
| 7,081,579 B2* | 7/2006 | Alcalde | ............. | G06F 17/30743 700/94 |
| 2005/0098023 A1* | 5/2005 | Toivonen | ............. | G10H 1/0058 84/615 |
| 2006/0270395 A1* | 11/2006 | Dhawan | ............... | H04M 1/7253 455/418 |
| 2008/0091717 A1* | 4/2008 | Garbow | ............. | G06F 17/30749 |
| 2008/0114805 A1* | 5/2008 | Nord | ..................... | H04L 65/605 |
| 2008/0195239 A1* | 8/2008 | Rotholtz | ........... | G06F 17/30749 700/94 |
| 2009/0019374 A1* | 1/2009 | Logan | ................. | H04M 3/4872 715/753 |
| 2009/0041209 A1* | 2/2009 | Agapi | ................. | H04M 3/4285 379/87 |
| 2009/0043591 A1* | 2/2009 | Breebaart | ............... | H04S 3/004 704/500 |
| 2009/0182813 A1* | 7/2009 | McCartie | ............... | H04N 7/163 709/205 |
| 2010/0017714 A1* | 1/2010 | Agarwal | ................ | G06Q 10/00 715/716 |
| 2010/0023578 A1* | 1/2010 | Brant | ................. | G06F 17/30749 709/203 |
| 2010/0082731 A1* | 4/2010 | Haughay | ........... | G06F 17/30749 709/203 |
| 2011/0075848 A1* | 3/2011 | Purnhagen | ............... | H04R 5/00 381/2 |
| 2011/0295843 A1* | 12/2011 | Ingrassia, Jr. | ...... | G06F 17/30053 707/723 |
| 2011/0314388 A1* | 12/2011 | Wheatley | ............. | G11B 27/034 715/751 |
| 2012/0185291 A1* | 7/2012 | Ramaswamy | ..... | G06Q 10/1095 705/7.19 |
| 2013/0110921 A1* | 5/2013 | Logan | ............... | G06F 17/30053 709/204 |
| 2013/0191454 A1* | 7/2013 | Oliver | .................... | G06Q 10/10 709/204 |
| 2015/0046267 A1* | 2/2015 | MacTiernan | ............ | H04L 51/32 705/14.66 |
| 2015/0127818 A1* | 5/2015 | Bates | ................ | G06F 17/30749 709/224 |

* cited by examiner

*Primary Examiner* — Farid Homayounmehr
*Assistant Examiner* — Sanchit Sarker

(57) ABSTRACT

Exemplary collaborative event playlist systems and methods are disclosed herein. An exemplary system includes a moderator device located at an event premises, connected to a local area network at the event premises, and hosting a collaborative event playlist for playback at an event at the event premises. The system further includes a participant device located at the event premises, connected to the local area network at the event premises, and configured to communicate with the moderator device by way of the local area network to participate in populating the collaborative event playlist with a song to which the participant device has access rights. Corresponding methods and systems are also disclosed.

24 Claims, 11 Drawing Sheets

COLLABORATIVE EVENT PLAYLIST SYSTEMS AND METHODS

BACKGROUND INFORMATION

Traditionally, a person who controls the music played at an event is referred to as a "disc jockey" or "deejay." For example, when a person hosts an event such as a party, the person may act as the disc jockey or ask another person to act as the disc jockey by controlling the music played at the party. The person acting as the disc jockey then manually selects songs, e.g., from a music library such as the personal music collection of the party host, to be played at the party. The person acting as the disc jockey typically selects songs to be played at the party (e.g., by arranging a playlist of songs) with the audience and/or a desired vibe of the party in mind. However, the person acting as the disc jockey may be limited to selecting songs from his or her own personal music collection and/or the music collection of the party host. A more collaborative, automated, and/or social experience related to the music played at the party and/or at another event is desired.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary collaborative event playlist systems and methods are disclosed herein. The exemplary systems and methods described herein may provide attendees of an event at an event premises with a collaborative, automated, and/or social experience related to music played at the event. For example, event attendees and/or attendee devices may be able to participate in populating a collaborative event playlist with songs to which the attendees have access rights (e.g., songs included in the attendees' personal music libraries) for playback at the event in accordance with the playlist. In some examples, the collaborative event playlist systems and methods described herein may provide event attendees with one or more tools for use by the attendees to provide input to actively participate in populating a collaborative event playlist (e.g., by initiating a request to add a song to the playlist and/or by voting to allow or block an addition of a song to the playlist). In additional or alternative examples, the collaborative event playlist systems and methods described herein may automatically select and use certain songs (e.g., songs having one or more attributes that match one or predefined parameters of the playlist) to which the attendees have access rights to populate a collaborative event playlist with minimal or no interaction by the attendees.

The collaborative event playlist systems and methods described herein may generate a collaborative event playlist to include songs selected to provide a certain "vibe" at an event. The vibe may be created by selecting and playing back songs that have matching or similar attributes such as genres, artists, tempos, keys, chords, lyrics, moods, instruments (e.g., guitar), etc. Examples of collaborative event playlist systems and methods will now be described in reference to the accompanying drawings.

Figure 1:
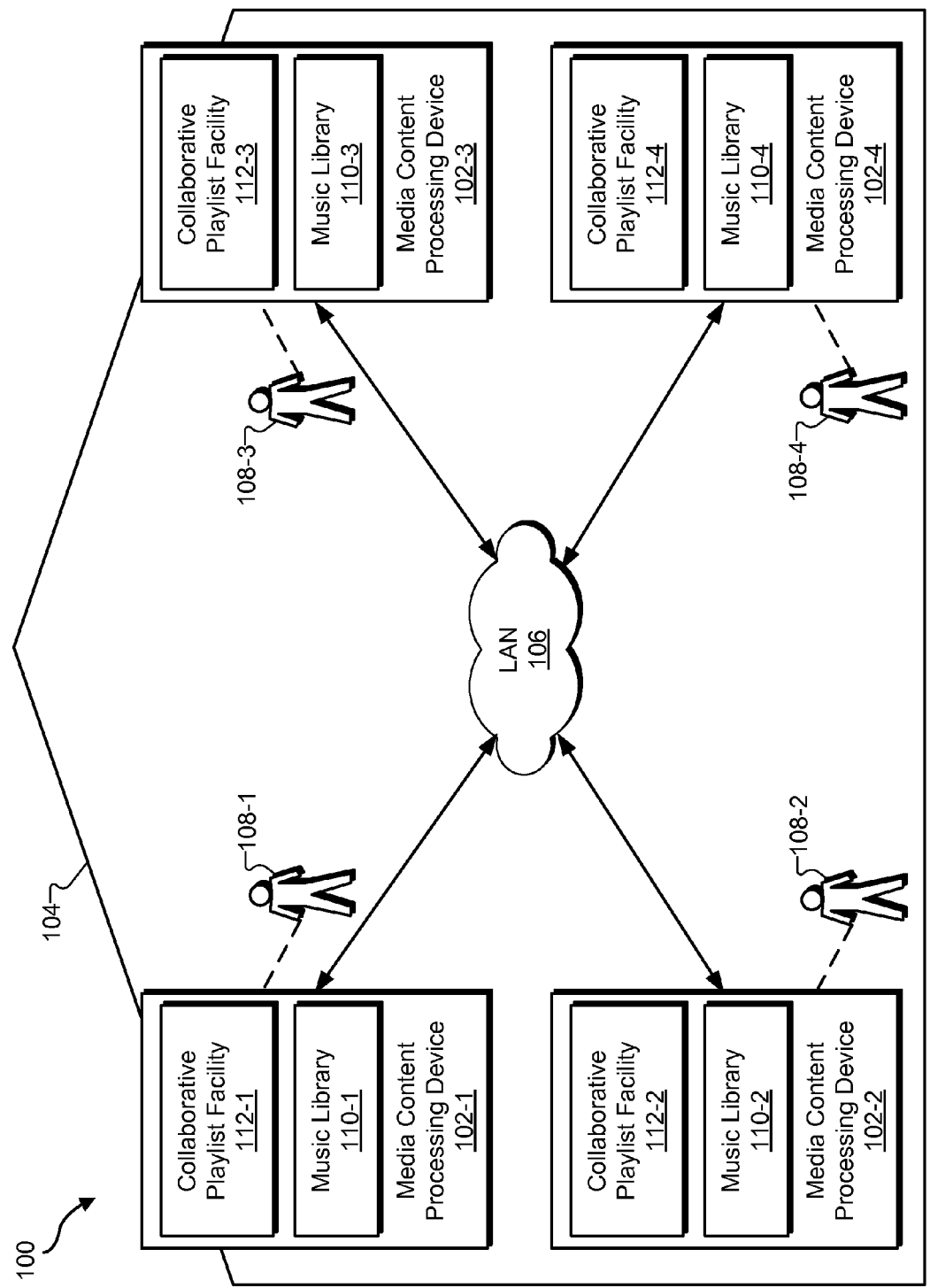
FIG. 1 illustrates an exemplary collaborative event playlist system according to principles described herein.

FIG. 1 illustrates an exemplary collaborative event playlist system 100 ("system 100"). As shown, system 100 may include a plurality of media content processing devices 102 (e.g., media content processing devices 102-1 through 102-4), which may be referred to simply as "media devices 102." As further shown, media devices 102 may be located at an event premises 104 and may be configured to connect to a local area network ("LAN") 106 at the event premises 104 such that media devices 102 are able to communicate one with another by way of LAN 106 at the event premises 104. Media devices 102 may employ any suitable technologies for connecting to LAN 106 and for communicating and/or transferring data between one another by way of LAN 106.

Event premises 104 may include a physical premises at which an event is or may be hosted. For example, event premises 104 may include a home, office, school, or other building structure at which an event is or may be hosted. An event may include any planned or unplanned gathering of people at the event premises 104. For example, an event may include a party or other social gathering of people.

LAN 106 may include any network that interconnects media devices 102 physically located within a limited local geographical area (e.g., at event premises 104) and/or without the use of leased telecommunications lines. LAN 106 may utilize any suitable wired and/or wireless local network technologies, such as Wi-Fi and/or Ethernet technologies, to facilitate communications between multiple media devices 102 interconnected by way of LAN 106. LAN 106 may include one or more network devices such as a router (e.g., a broadband home router) configured to provide LAN 106 and facilitate communications between media devices 102 connected to LAN 106.

While FIG. 1 shows media devices 102 connected to LAN 106, this is illustrative only. In other implementations, media devices 102 may be additionally or alternatively connected to one or more other networks, including to a wide area network such as the Internet. In such implementations, any of the communications between media devices 102 via LAN 106 described herein may be additionally or alternatively performed by way of one or more other networks, including a wide area network such as the Internet. In certain embodiments, for example, a media device 102 may be out of range of LAN 106 and may communicate with one or more other media devices 102 by way of a wide area network instead of LAN 106.

A media device 102 may include any consumer electronics device or other computing device that may be physically located at event premises 104, that may connect to LAN 106 and/or another network such as the Internet, and that may process media content. Examples of a media device 102 may include, without limitation, a personal computer, a mobile phone, a smart phone, a tablet computer, a set-top box device, a digital video recorder ("DVR") device, a gaming device, a portable media player device, a mobile computing device, and any other computing device configured to process media content and connect to LAN 106 and/or another network.

In certain examples, each media device 102 may be associated with (e.g., operated by, owned by, or otherwise associated with) a different user. For example, in FIG. 1, media device 102-1 is associated with user 108-1, media device 102-2 is associated with user 108-2, media device 102-3 is associated with user 108-3, and media device 102-4 is associated with user 108-4. The users may be attendees at an event (e.g., partygoers at a party) hosted at event premises 104.

Each media device 102 may be configured to access media content to which the media device 102 and/or the user 108 associated with the media device 102 have access rights. For example, media device 102-1 may be configured to access media content to which user 108-1 and/or media device 102-1 have access rights. The access rights may be in any suitable form and may include, without limitation, ownership of the media content by a user 108, license rights owned by a user 108 (e.g., subscription rights subscribed to by a user 108), digital rights management ("DRM") privileges possessed by a user 108, and any other rights that indicate that a media device and/or a user has legitimate access to media content.

In certain examples, a media device 102 having access rights to media content may mean that the media device 102 stores data representative of the media content in local memory within the media device 102. In certain other examples, a media device 102 having access rights to media content may mean that the media device 102 stores data representative of credentials that may be used to access the media content, such as by providing the credentials to a server device over a network (e.g., a wide area network or a local area network) to access the media content. Access rights to media content may be initially obtained by the media device 102 and/or a user 108 associated with the media device 102 in any suitable way, such as by purchasing the media content, downloading the media content, and/or subscribing to a service that provides the media content.

The media content to which a user 108 and/or media device 102 have access rights may include media content in a personal media library of the user 108. Such a library may include any form or forms of media content to which the user 108 has access rights, including video, audio, and/or image content. For example, a personal media library of a user 108 may include a library of audio content such as one or more digital songs that are accessible by a media device 102 associated with the user 108 through the access rights of the user 108 and/or the media device 102 to access the digital songs.

In FIG. 1, each user 108 has access to his or her discrete personal music library, and each media device 102 associated with each user 108 locally stores data representative of the personal music library of the user 108. For example, media device 102-1 stores a music library 110-1 of user 108-1, media device 102-2 stores a music library 110-2 of user 108-2, media device 102-3 stores a music library 110-3 of user 108-3, and media device 102-4 stores a music library 110-4 of user 108-4.

Each media device 102 may access the music library 110 of the user 108 associated with the media device 102 in any suitable way and/or from any suitable source. For example, while FIG. 1 shows each media device 102 locally storing the music library 110 of the user 108 associated with the media device 102 such that the music library 110 may be locally accessed by the media device 102, alternatively or additionally, a media device 102 may be configured to access the associated user's 108 music library 110 from a remote source, such as over a wide area network (e.g., the Internet, a satellite media broadcast network (e.g., an XM radio network), etc.)) from a server device associated with a cloud-based media management service and/or media content service provided by a service provider. For example, a user 108 may use a hosted online media management service to store, access, and/or otherwise manage media content (e.g., a music library 110) to which the user 108 has access rights. As another example, a user 108 may subscribe to a service through which the user 108 may access (e.g., stream) media content that is made available by a media content service provider by way of the service.

Each media device 102 may implement a collaborative playlist facility 112. In FIG. 1, media device 102-1 implements collaborative playlist facility 112-1, media device 102-2 implements collaborative playlist facility 112-2, media device 102-3 implements collaborative playlist facility 112-3, and media device 102-4 implements collaborative playlist facility 112-4.

A collaborative playlist facility 112 may be implemented in any suitable form by a media device 102. For example, a collaborative playlist facility 112 may include and/or be implemented by any hardware and/or computing instructions implemented by a media device 102. In certain examples, a collaborative playlist facility 112 may include a software application (e.g., a "mobile app") installed and configured to be executed by a media device 102.

Figure 2:
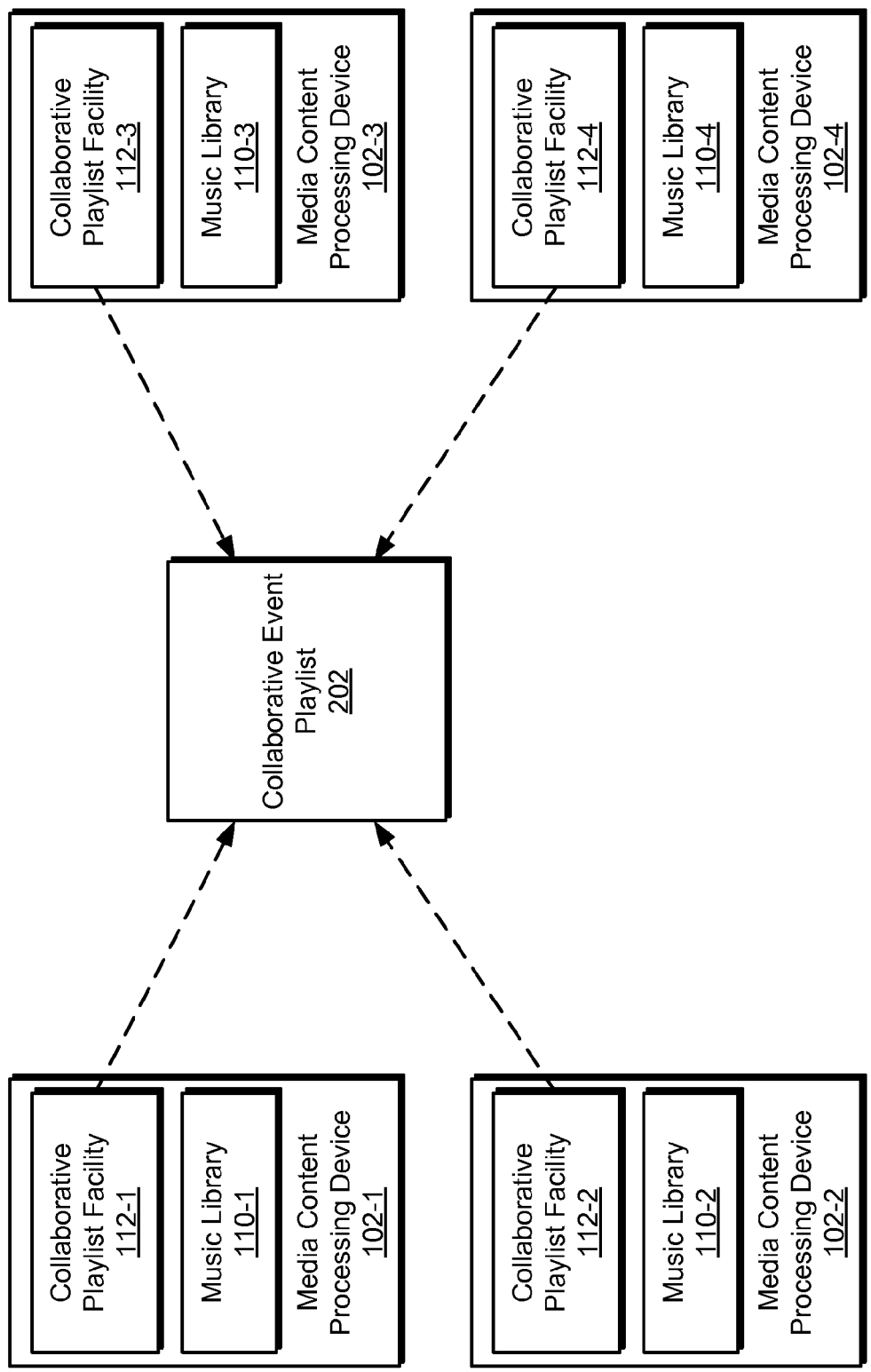
FIG. 2 illustrates an exemplary collaborative event playlist that may be generated by the collaborative event playlist system of FIG. 1 according to principles described herein.

A collaborative playlist facility 112 may be configured to perform (e.g., by directing a media device 102 implementing the collaborative playlist facility 112 to perform) one or more of the collaborative playlist operations described herein to facilitate system 100 providing a collaborative event playlist of media content for playback at an event hosted at event premises 104. For example, a plurality of collaborative playlist facilities 112 implemented by a plurality of respective media devices 102 connected to LAN 106 at event premises 104 may perform one or more of the collaborative playlist operations described herein to provide a collaborative event playlist 202 ("playlist 202") shown in FIG. 2, to populate the playlist 202 with media content such as one or more songs, and to play the media content included in the playlist 202 at an event at event premises 104 in accordance with the playlist 202.

Playlist 202 may be collaborative in one or more ways. As an example, playlist 202 may include songs accessed by way of multiple different music libraries 110 associated with different media devices 102 and/or users 108. As another example, playlist 202 may include songs that are selected for inclusion in playlist 202 based on multiple different music libraries 110 (e.g., based on one or more attributes of music libraries 110 and/or songs included in music libraries 110) and/or based on input provided by one or more users 108 of one or more media devices 102 (e.g., input requesting that a song be added to playlist 202 and/or input indicated a vote to add a song to or to block or remove a song from playlist 202). The collaborative nature of playlist 202 may facilitate creation and playback of songs designed to provide a certain vibe at an event. The vibe may be selected and created based at least in part of attributes of music libraries 110 associated with users 108 attending the event and/or based on collaborative playlist input provided by user 108s attending the event, such as described herein.

The collaborative playlist facilities 112 implemented by the respective media devices 102 connected to LAN 106 at event premises 104 may be configured to discover one another. For example, a collaborative playlist facility 112 implemented by a media device 102 may be configured to scan LAN 106 to automatically detect any other media device 102 that is connected to LAN 106 and that implements collaborative playlist facility 112. Device discovery may be performed in any suitable way. For example, a media device 102 may request and receive device discovery data from any other media devices 102 that are connected to LAN 106 and that also implement collaborative playlist facility 112. For example, the media device 102 may broadcast a device discovery request message to all other devices connected to LAN 106. Any other media devices 102 that are connected to LAN 106 and that implement collaborative playlist facility 112 may receive, process, and respond to the discovery data request message. Accordingly, the media device 102 may receive device discovery data from each of the other media devices 102 that implement collaborative playlist facility 112 and that are connected to LAN 106. The discovery data may include any information about other media devices 102 connected to LAN 106. For example, the discovery data may specify network address information (e.g., hostname, IP address information, MAC address information, and/or any other address information) for the media devices 102. A media device 102 may be configured to continually scan LAN 106 to detect media devices 102 that have connected to and/or disconnected from LAN 106 (e.g., as attendees come and go to/from event premises 104) since the previous scan.

Additionally or alternatively, a collaborative playlist facility 112 implemented by a media device 102 may be configured to scan LAN 106 to automatically detect any other media device 102 that is connected to LAN 106, including any other media device 102 that does not implement collaborative playlist facility 112. When such a media device 102 is detected, a user 108 of the detected media device 102 may be invited to download and install collaborative playlist facility 112 on the media device 102 and/or to opt in to participate and/or allow the media device 102 to participate in populating playlist 202 (e.g., by allowing a music library 110 implemented by the media device 102 to be accessed and information about the music library 110 used by another media device 102 to select songs with which to populate playlist 202).

Figure 3:
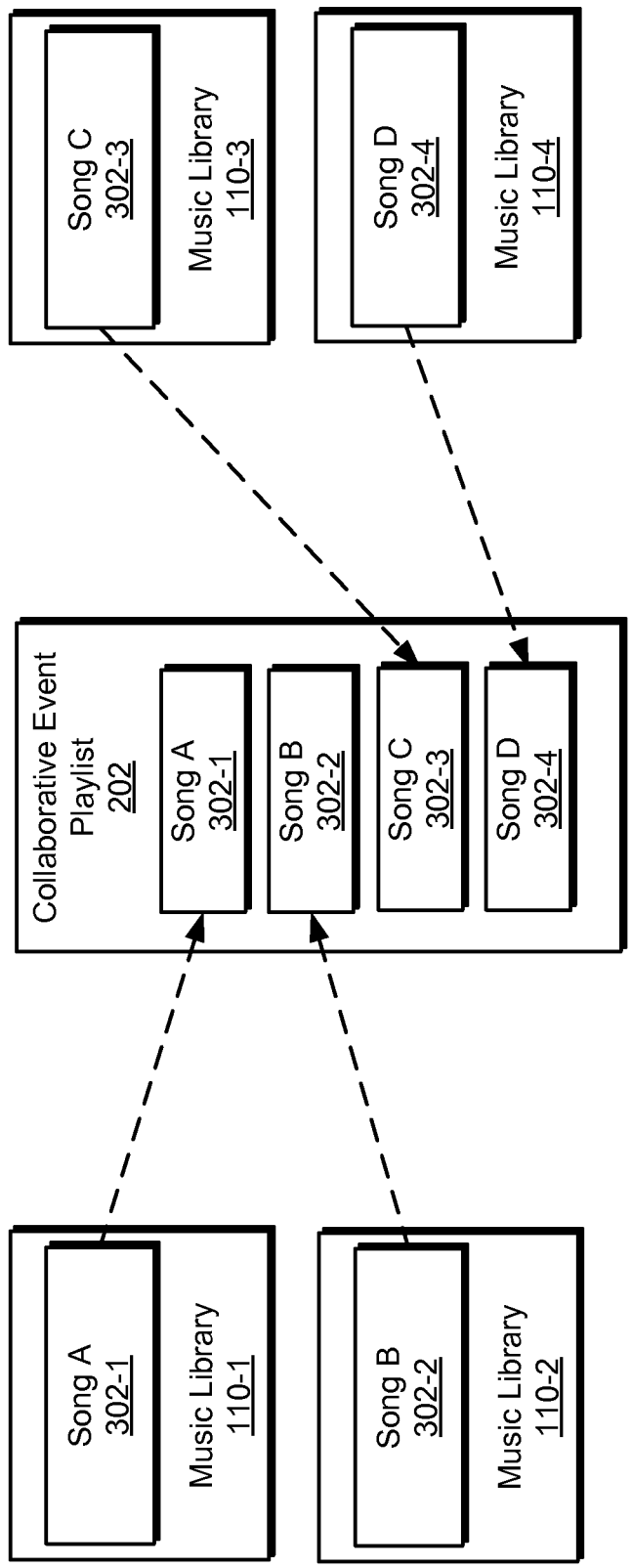
FIG. 3 illustrates the collaborative event playlist of FIG. 2 populated with songs from discrete music libraries according to principles described herein.

The collaborative playlist facilities 112 implemented by the respective media devices 102 connected to LAN 106 at event premises 104 may be configured to populate the playlist 202 with one or more songs from one or more music libraries 110 to which the media devices 102 and/or users 108 have access rights. For example, FIG. 3 illustrates playlist 202 populated with songs 302 (songs 302-1 through 302-4) from the music libraries 110 to which the media devices 102 and/or users 108 have access rights. As shown, playlist 202 may include a song 302-1 titled "song A" from music library 110-1, a song 302-2 titled "song B" from music library 110-2, a song 302-3 titled "song C" from music library 110-3, and a song 302-4 titled "song D" from music library 110-4.

A collaborative playlist facility 112 implemented by a media device 102 may be configured to operate in one or more modes, examples of which may include a moderator mode, a collaborative participant mode, and a non-collaborative mode. When collaborative playlist facility 112 operates in moderator mode, a user 108 of the media device 102 implementing collaborative playlist facility 112 may create and moderate a collaborative event playlist in any of the ways described herein. For example, the user 108 acting as the playlist moderator may, without limitation, define parameters for the playlist (e.g., to define a vibe of the playlist), control which attendees are invited and/or allowed to join and participate with the playlist, ultimately control whether a song is added to and/or kept on the playlist, and perform any other action to moderate the playlist.

When collaborative playlist facility 112 operates in collaborative participant mode, the media device 102 implementing collaborative playlist facility 112 and/or the user 108 of the media device 102 implementing collaborative playlist facility 112 may participate with a collaborative event playlist hosted by another media device 102 in a collaborative manner, including by collaborating with the playlist moderator and/or one or more other participants to populate the collaborative event playlist in any of the ways described herein. For example, the user 108 of the media device 102 may utilize the media device 102 to submit a request to add a song that is included in the user's 108 personal music library to the collaborative event playlist. As another example, the media device 102 implementing collaborative playlist facility 112 may provide information about the user's 108 personal music library to another media device 102 for use by the other media device 102 to identify and/or select one or more songs from the user's 108 personal music library for addition to the playlist.

When collaborative playlist facility 112 operates in non-collaborative participant mode, the user 108 of the media device 102 implementing collaborative playlist facility 112 may access information related to the collaborative event playlist and/or participate with the playlist in any of the non-collaborative ways described herein. For example, the user 108 may access information about the playlist and provide comments and/or feedback (e.g., "thumbs up" or "thumbs down") about the playlist and/or specific songs included in the playlist, without directly requesting to add a song to the playlist. As another example, the media device 102 implementing collaborative playlist facility 112 may provide information about the user's 108 personal music library to another media device 102 for use in selecting songs for the playlist but without providing access to the songs from the user's 108 personal music library.

An exemplary implementation and operation of system 100 will now be described. User 108-1 of media device 102-1 may want to host a collaborative event playlist of songs for playback at an event at event premises 104. To this end, media device 102-1 may include or be communicatively coupled to one or more audio speakers and/or other audio equipment such that the playlist of songs may be played at event premises 104. User 108-1 may interact with a user interface provided by collaborative playlist facility 112-1 implemented by media device 102-1 to request that a collaborative event playlist be created and hosted by collaborative playlist facility 112-1. Collaborative playlist facility 112-1 may respond by creating a new collaborative event playlist (e.g., by creating one or more data objects for the playlist). In this configuration, collaborative playlist facility 112-1 operates in moderator mode, media device 102-1 may be referred to as a "moderator device," and user 108-1 may be referred to as a "moderator" of the collaborative event playlist hosted by the moderator device.

Figure 4:
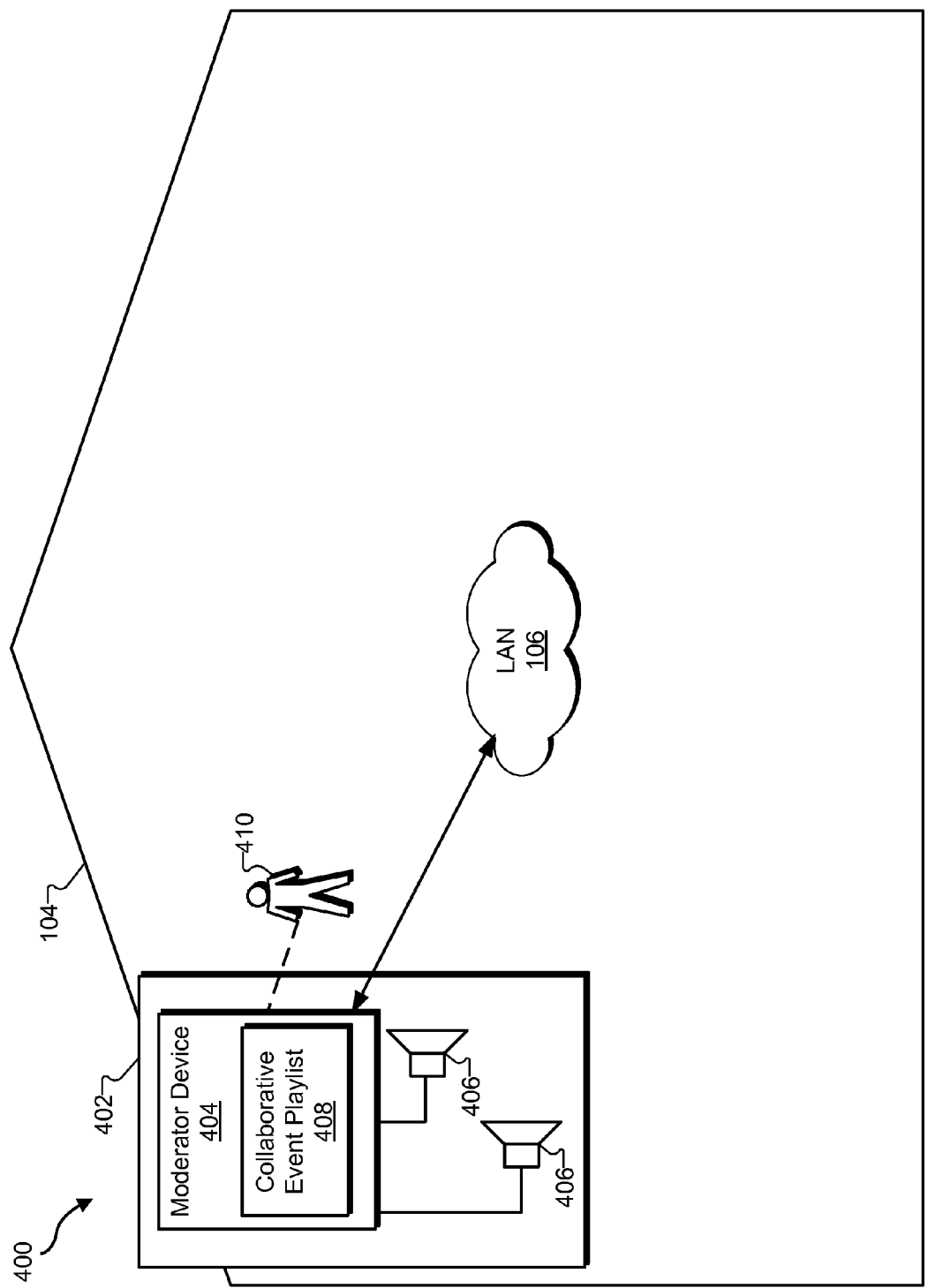
FIG. 4 illustrates an exemplary configuration of the system of FIG. 1 in which a moderator device hosts a collaborative event playlist at an event premises according to principles described herein.

FIG. 4 illustrates an example of this configuration 400 in which a moderator subsystem 402 includes a moderator device 404 communicatively connected to one or more speakers 406 and to LAN 106 at event premises 104. Moderator device 404 may implement a collaborative playlist facility 112 operating in moderator mode and hosting a collaborative event playlist 408 ("playlist 408"). A moderator 410 operating moderator device 404 may act as a moderator for playlist 408. Songs added to playlist 408 by moderator device 404 may be played by moderator subsystem 402 for experiencing by one or more attendees of the event at event premises 104.

Moderator 410 may utilize a user interface provided by moderator device 404 to define one or more parameters for playlist 408, which parameters may be used by moderator device 404 to selectively choose songs to add and/or not to add to playlist 408 and/or to control participants in playlist 408. Examples of such parameters may include a playlist vibe (e.g., a "techno dance" vibe, a "romantic" vibe, a "sophisticated" vibe, a "1990's gangster rap" vibe, etc.), a playlist tempo (e.g., an "upbeat," "rhythmic," or "slow" tempo), a playlist mood (e.g., a "happy," "carefree," or "intense" mood), a music genre (or set of genres), a music artist (or set of artists), a song lyric (e.g., a certain word and/or other lyric included in a song), user and/or device identifiers for users and/or devices allowed and/or blocked from participating in playlist 408, and/or any other parameters that may be used to select songs for a playlist based on one or more attributes of the songs and/or to control playlist participants.

During the event at event premises 104, certain event attendees carrying mobile media devices 102 may be located at event premises 104. Moderator device 404 hosting collaborative event playlist 408 may be configured to discover other media devices 102 located at event premises, such as described herein.

Moderator device 404 may be configured to send invitation messages to one or more of the discovered media devices 102. For example, moderator device 404 may discover that media devices 102-2 and 102-3 are connected to LAN 106 during the event and may transmit invitation messages to the media devices 102-2 and 102-3 by way of LAN 106 to invite media devices 102-2 and 102-3 and/or users 108-2 and 108-3 of media devices 102-2 and 102-3 to join and participate in playlist 408 such as by collaborating to populate playlist 408. Media devices 102-2 and 102-3 may receive and process the invitation messages to join playlist 408.

Alternatively, a media device 102 other than moderator device 404 may be configured to discover media devices 102 connected to LAN 106 and/or any collaborative event playlists that are accessible by way of LAN 106. The discovery may be accomplished in any suitable way, including by a media device 102 broadcasting a device discovery request message and/or a hosted playlist discovery message to all devices connected to LAN 106. When a media device 102 discovers playlist 408 hosted by moderator device 404, the media device 102 may send a request to join playlist 408 to moderator device 404 by way of LAN 106. Moderator device 404 may receive and process the request to determine whether to allow the media device 102 to join playlist 408. The determination may be performed in any suitable way and based on any suitable criteria. For example, the determination may be performed automatically by moderator device 404 based on one or more predefined playlist participant parameters and/or in response to input provided by moderator 410 indicating whether the media device 102 will be allowed to join playlist 408. In certain examples, moderator device 404 may receive requests to join playlist 408 from media devices 102-2 and 102-3 and process the requests such that media devices 102-2 and 102-3 join playlist 408.

When media devices 102-2 and 102-3 are allowed to join playlist 408, collaborative playlist facilities 112-2 and 112-3 implemented by media devices 102-2 and 102-3 may operate in collaborative participant mode with respect to playlist 408 to allow media devices 102-2 and 102-3 and/or users 108-2 and 108-3 to participate in populating playlist 408. In this configuration, media devices 102-2 and 102-3 may each be referred to as a "participant device," and users 108-2 and 108-3 may each be referred to as a "participant" in populating playlist 408.

Figure 5:
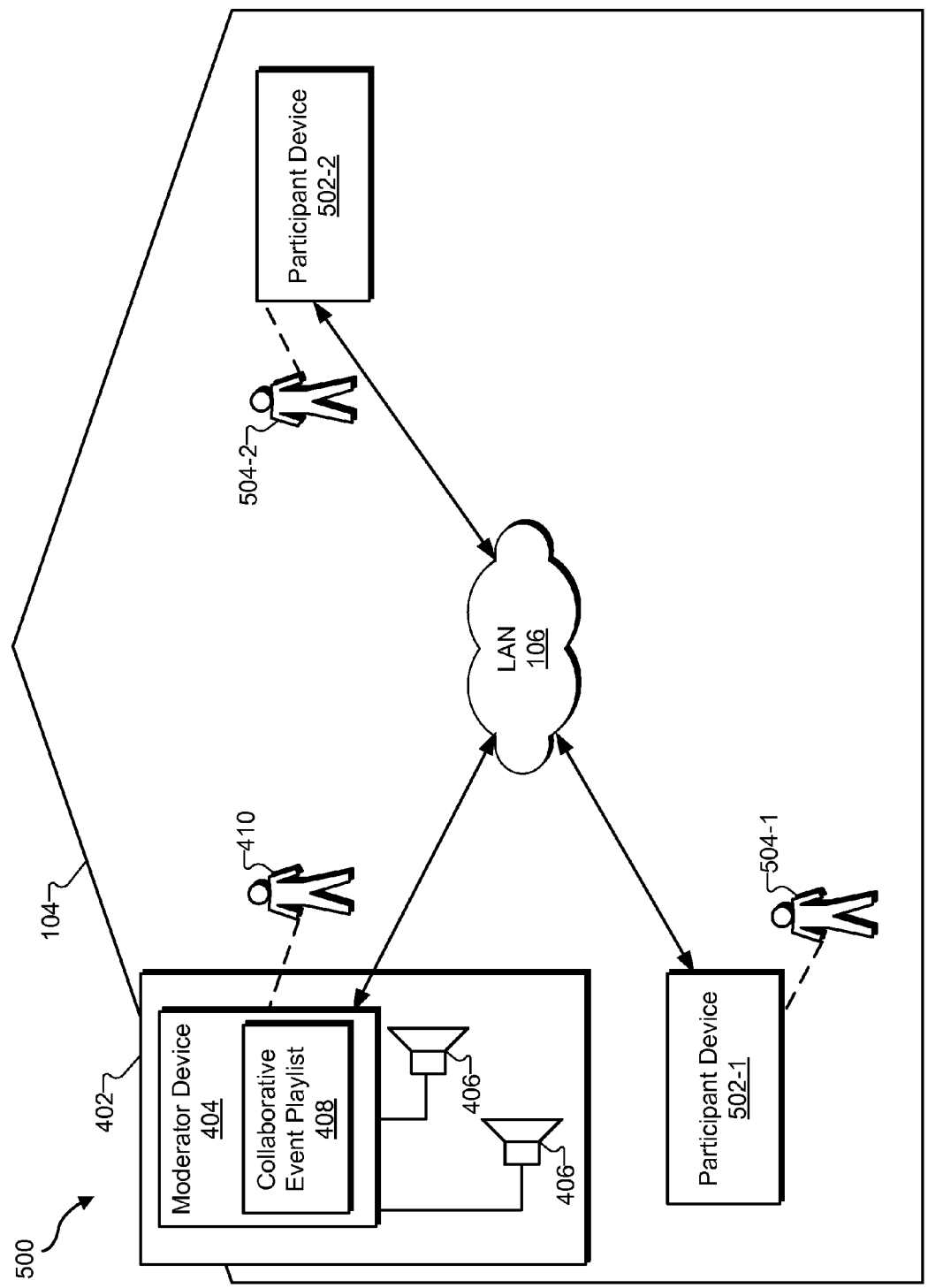
FIG. 5 illustrates an exemplary configuration of the system of FIG. 1 in which a moderator device hosts a collaborative event playlist at an event premises and participant devices are configured to communicate with the moderator device to participate in populating the collaborative event playlist according to principles described herein.

FIG. 5 illustrates an example of this configuration 500 in which moderator device 404 hosts playlist 408 and participant devices 502 (participant devices 502-1 and 502-2) located at event premises 104 and connected to LAN 106 are configured to communicate with moderator device 404 by way of LAN 106 to facilitate participation of participant devices 502 and/or participants 504 (participants 504-1 and 504-2) operating participant devices 502 in populating playlist 408.

To illustrate, in configuration 500, participant 504-1 may utilize participant device 502-1 to access information related to playlist 408, including, without limitation, information about parameters of playlist 408 (e.g., one or more rules and/or other parameters defined by moderator 410), participants who have joined playlist 408, moderator 410, and songs included in playlist 408. Participant 504-1 may further utilize participant device 502-1 to request that a song to which participant device 502-1 has access rights (e.g., a song included in participant's 504-1 personal music library and/or a song provided by a media content service to which participant 504-1 subscribes) be added to playlist 408 for playback at the event. Participant device 502-1 may transmit the request to moderator device 404 by way of LAN 106.

Moderator device 404 may receive and process the request. The processing may include adding the song to playlist 408 such that the song is queued up for playback by moderator subsystem 402 at the event in accordance with the playlist 408 (e.g., in accordance with an order specified by playlist 408).

To illustrate another example, moderator device 404 may access information about a music library associated with participant 504-1 and/or participant device 502-1, such as by communicating with participant device 502-1 by way of LAN 106 to request and receive metadata for songs included in the music library. Moderator device 404 may use the metadata and/or other information to analyze songs included in the music library and to select, based on one or more predefined playlist parameters and one or more attributes of the songs included in the library, a song from the library for addition to playlist 408. For example, moderator device 404 may determine that a song included in the library matches a predefined vibe of playlist 408 and select the song for addition to playlist 408. Moderator device 404 may then add data representative of the selected song to playlist 408.

Moderator device 404 may access the song included on playlist 408 for playback at the event in any suitable way, including by leveraging the access rights of the participant device 502-1 to access the song. Examples of moderator device 404 accessing the song included on playlist 408 will now be described. In these examples, the security of the song may be protected using any suitable technologies, including, for example, by using a secure media transfer protocol, storing data in a hidden and/or protected "container," deleting song data after playback, etc.

Figure 6:
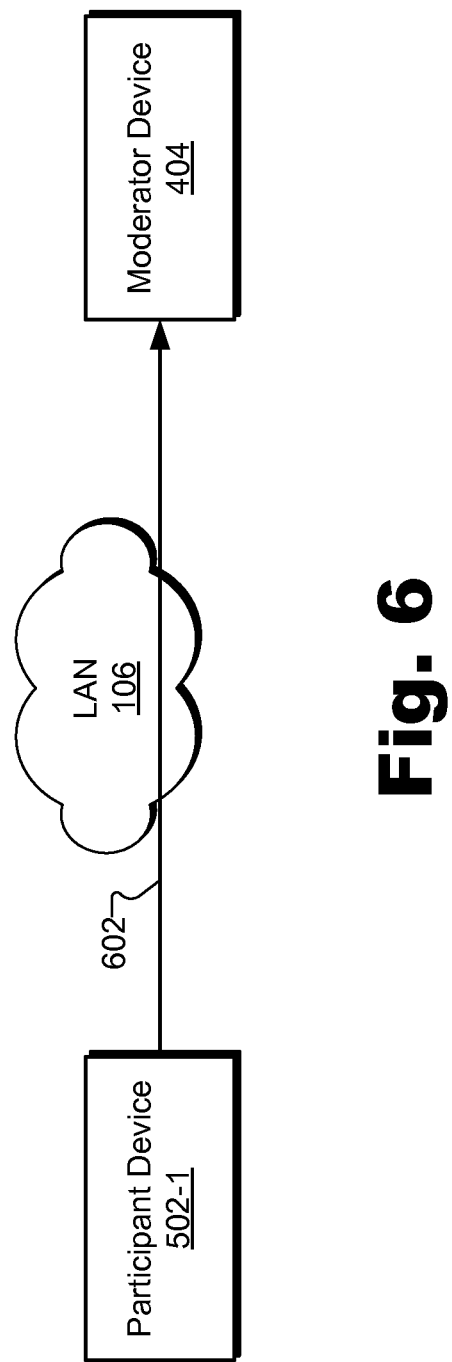
FIGS. 6-7 illustrate examples of a moderator device accessing data representative of a song according to principles described herein.

In certain embodiments, the song may be streamed from participant device 502-1 to moderator device 404 by way of LAN 106. For example, moderator device 404 may request that participant device 502-1 begin streaming the song when the song is up for playback in playlist 408. As the song is streamed, moderator device 404 may receive and process the stream such that the song is played at the event. FIG. 6 illustrates an example of a song being streamed (602) from participant device 502-1 to moderator device 404 by way of LAN 106. Alternatively, the song may be streamed from participant device 502-1 to moderator device 404 by way of another network, including a wide area network such as the Internet.

In certain embodiments, data representative of the song may be transferred from participant device 502-1 to moderator device 404 by way of LAN 106 (or another network in other implementations) in advance of the song being up for playback in playlist 408. Accordingly, moderator device 404 may obtain and temporarily store a copy of the song such that the copy of the song is locally available (e.g., within moderator device 404) when the song is up for playback. Moderator device 404 may then use the locally stored copy of the song to play the song at the event. In this configuration, the playback of the song may be performed without interruption even if participant device 502-1 were to lose communication with moderator device 404 during the playback (e.g., such as may happen if participant 504-1 leaves event premises 104 during or before playback of the song). After moderator device 404 has completed playback of the song, moderator device 404 may automatically delete the locally stored copy of the song, which may help to manage digital rights associated with the song.

By moderator device 404 obtaining a temporary copy of the song in advance of the playback of the song, complexity may be minimized. For example, moderator device 404 is then able to use the locally stored copy of the song for playback and would not need to perform additional communications with participant device 502-1 to initiate streaming of the song from participant device 502-1 to moderator device 404 at the appropriate time when the song is up for playback.

Figure 7:
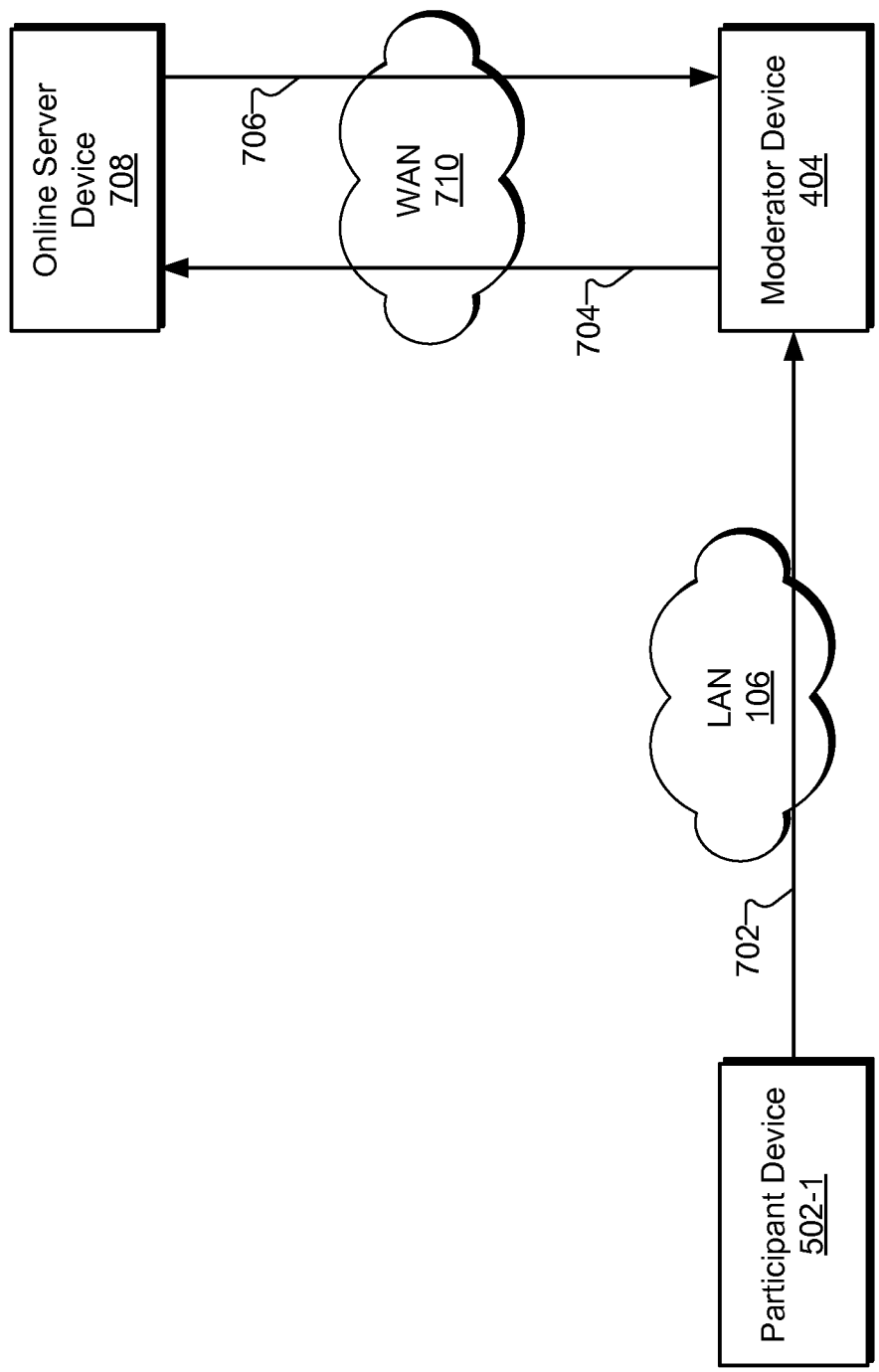

In certain embodiments, data representative of the song may be streamed from a media content server device located external to event premises to moderator device 404 by way of a wide area network. For example, moderator device 404 may receive song information (e.g., song fingerprint data, credentials for accessing the song, etc.) from participant device 502-1 by way of LAN 106. Moderator device 404 may then use the song information to request and receive a stream carrying the song from the media content server device by way of the wide area network. As the song is streamed, moderator device 404 may receive and process the stream such that the song is played at the event. FIG. 7 illustrates an example of moderator device 404 receiving (702) song information from participant device 502-1 and requesting (704) and receiving (706) a stream carrying a song from a media content server device 708 ("server device 708") by way of a wide area network ("WAN") 710.

Server device 708 may include any server computing device or set of server computing devices located external to event premises 104 and configured to provide media content over WAN 710. As an example, server device 708 may include an online media content hosting server device configured to provide a hosted service that stores media content such as a music library of participant 504-1 and allows participant 504-1 to utilize participant device 502 and/or any other suitable media device 102 to access the hosted media content by way of WAN 710. For instance, server device 708 may store or have access to a database that includes participant's 504-1 personal music library. As another example, server device 708 may include a media content service provider server device that is configured to provide access to media content over WAN 710 as part of a service (e.g., a radio streaming service, etc.).

WAN 710 may include any wide area network or combination of wide area networks. For example, WAN 710 may include, without limitation, a mobile phone network (e.g., a cellular phone network, a mobile data network, a 3G network, a 4G network, etc.), a satellite media network (e.g., a broadcasting network, a terrestrial media broadcasting network, etc.), a media content distribution network (e.g., a subscriber television network, a media broadcasting, multicasting, and/or narrowcasting network, etc.), a telecommunications network, the Internet, any other wide area network capable of transporting communications and data between server device 708 and a media device 102, and/or any combination or sub-combination thereof.

In any of the above-described examples of moderator device 404 accessing a song, moderator device 404 may be configured to leverage the access rights of a participant device 502 and/or a participant 504 associated with the participant device 502 to access the song. For example, when moderator device 404 accesses the song from a participant device 502 by way of LAN 106, access rights to the song by the participant device 502 are inherently implied by the possession of the song by the participant device 502. Accordingly, moderator device 404 may assume from the possession of the song by the participant device 502 that the participant device 502 and/or the participant 504 associated with the participant device 502 have appropriate access rights to the song. As another example, when moderator device 404 accesses the song from server device 708 by way of WAN 710, moderator device 404 may first verify that the participant device 502 and/or the participant 504 associated with the participant device 502 have appropriate access rights to access the song from server device 708. To this end, moderator device 404 may obtain information from the participant device 502 that can be used to verify appropriate access rights. For instance, moderator device 404 may obtain a fingerprint of the song from the participant device 502, which fingerprint, when verified to be correct, inherently implies that the participant device 502 has possession of the song. Accordingly, moderator device 404 may assume from the fingerprint of the song that the participant device 502 that the participant device 502 and/or the participant 504 associated with the participant device 502 have appropriate access rights to the song. In additional or alternative examples, moderator device 404 may obtain other information from the participant device 502, such as credentials for accessing server device 708. Moderator device 404 may then use the credentials to access the song from server device 708.

In certain additional or alternative examples, moderator device 404 may use other access rights to access and play back a song added to playlist 408. For example, a song included in a music library associated with participant 504-1 and/or participant device 502-1 may be selected and added to playlist 408. Moderator device 404 may use information about the song to determine available options for accessing the song. For example, moderator device 404 may use the title of the song to search a database of a music streaming service and/or to search a music library associated with moderator device 404 (e.g., music stored on moderator device 404 that has not been added to playlist 408) for a match. If a match is found, moderator device 404 may use access rights of moderator device 404 and/or moderator 410 to access the song from the music streaming service and/or from the music library of moderator device 404, without having to leverage the access rights of participant 504-1 and/or participant device 502-1 to access the song.

Returning to FIG. 5, participant devices 502 and/or participants 504 may collaborate with moderator device 404 and/or moderator 410 to populate playlist 408 with one or more songs for playback at the event hosted at event premises 104. For example, participants 504 may utilize participant devices 502 to transmit requests to add specific songs to which participants 504 and/or participant devices 502 have access rights to playlist 408, as described above. Moderator 410 may have ultimate control over which requested songs are added to playlist 410. Additionally, moderator 410 may utilize moderator device 404 to populate playlist 408 with one or more songs to which moderator 410 and/or moderator device 404 have access rights. Accordingly, moderator 410 and participants 504 may collaborate to populate playlist 408 with songs from different personal digital music libraries 110 associated with different event attendees.

In certain examples, system 100 may be configured to provide different levels of participation such that event attendees may be allowed to participate with playlist 408 on different levels. For example, participants 504 shown in FIG. 5 may be full collaborative participants who are allowed to collaborate to populate playlist 408 such as by requesting that songs be added to playlist 408 and to participate in any other way with playlist 408. Other participants may be allowed to participate without being able to request that songs be added to playlist 408. For example, non-collaborative participants may be allowed to participate by viewing information about playlist 408 (e.g., upcoming songs included in playlist 408), providing comments and/or other feedback related to playlist 408 (e.g., "Best party mix ever!"), signing a playlist or event guest book, and participating in any other non-collaborative way.

In certain embodiments, moderator 410 may have control over who may join playlist 408 as collaborative participants and/or non-collaborative participants. In certain examples, moderator 410 may relinquish or delegate some control such as by allowing any participant (collaborative or non-collaborative) who has joined the playlist 408 to invite any event attendee to join playlist 408 as a non-collaborative participant. Accordingly, an event attendee participating in playlist 408 may invite a friend who is at the event to join playlist 408 as a non-collaborative participant. In certain examples, if the friend's media device has not implemented collaborative playlist facility 112, the invitation may be configured to prompt the friend to download and install collaborative playlist facility 112 so that the friend is able to join playlist 408. In other examples, if the friend's media device has not implemented collaborative playlist facility 112, the friend may still be able to join playlist 408 and to access limited functionality to non-collaborative participate with playlist 408, such as by viewing upcoming songs included in playlist 408.

To illustrate, participant 504-2 may utilize participant device 502-2 to invite a user 108-4 at event premises 104 to join playlist 408 as a non-collaborative participant. Collaborative playlist facility 112 implemented by a media device 102-4 associated with user 108-4 may communicate with participant device 502-2 and/or moderator device 404 to join playlist 408. Collaborative playlist facility 112 may then operate in a non-collaborative participant mode to allow user 108-4 to utilize media device 102-4 to access information related to playlist 408 and to participate with playlist 408 in any other non-collaborative way. In this configuration, media device 102-4 may be referred to as a "non-collaborative participant device," and user 108-4 may be referred to as a "non-collaborative participant."

Figure 8:
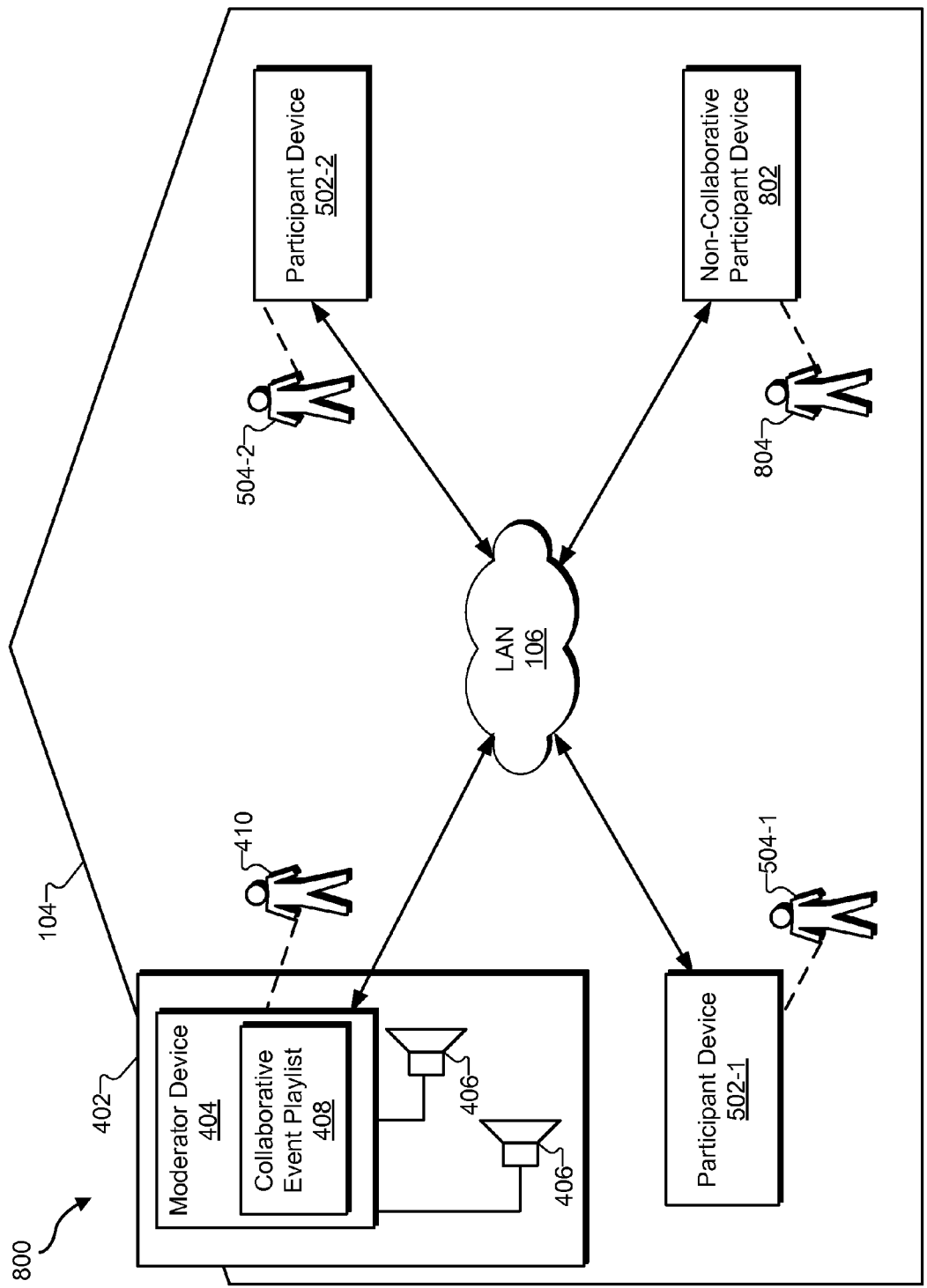
FIG. 8 illustrates an exemplary configuration of the system of FIG. 1 in which a moderator device hosts a collaborative event playlist at an event premises and participant devices are configured to communicate with the moderator device to provide different levels of participation with the collaborative event playlist according to principles described herein.

FIG. 8 illustrates an example of this configuration 800 in which moderator device 404 hosts playlist 408, participant devices 502 are configured to allow collaborative participants 504 to collaborate in populating playlist 408, and a non-collaborative participant device 802 is configured to allow a non-collaborative participant 804 to access information related to playlist 408 and to participate in any other non-collaborative way. Should participant 804 want to collaborate in populating playlist 408, participant 804 may utilize participant device 802 to send a request to moderator device 404 by way of LAN 106 to join playlist 408 as a collaborative participant. Moderator device 404 may selectively allow or disallow participant 804 to join as a collaborative participant based on predefined criteria and/or on input from moderator 410. Similarly, moderator device 404 may be configured to selectively allow a user 102 to join or block a user 102 from joining playlist at any level of participation based on predefined criteria and/or on input from moderator 410.

Collaborative playlist facility 112 implemented by a media device 102 may be configured to provide a user 108 of the media device 102 with one or more tools for joining and participating in a collaborative event playlist in any of the ways described herein. The tools may be provided to the user 108 in any suitable way, including by way of a user interface (e.g., a graphical user interface) provided by collaborative playlist facility 112.

With respect to a moderator participating in the playlist, the tools may include tools for use by the moderator to create the playlist, collaboratively participate in populating the playlist, and moderate the playlist. For example, to create a playlist, a moderator may access a user interface provided by collaborative playlist facility 112 and provide user input to instruct collaborative playlist facility 112 to create the playlist.

The tools may allow the moderator to define parameters for the playlist in a way that allows the moderator to have as much or as little control over the playlist as desired. The parameters may include any rules, settings, and/or other conditions configured to govern the playlist, such as by governing what songs or types of songs are allowed and/or not allowed to be added to the playlist, how participants are allowed to interact with the playlist, information and/or features to be made available to participants, what users 108 are allowed and/or invited to participate in the playlist, at what levels of participation participants are allowed to participate in the playlist, a level of automation of the playlist (e.g., whether creation of the playlist is fully automated, fully dependent on participant and/or moderator input, or dependent on a combination of automated and manual operations), and any other information, features, and/or functionality of the playlist. Examples of playlist parameters and associated functionality will now be described.

As an example, the tools may allow the moderator to blacklist select songs and/or types of songs. For instance, the moderator may specify song titles, artists, ratings, genres, and/or other song attributes to be used by collaborative playlist facility 112 to automatically block songs having the specified attributes from being added to a playlist. To illustrate, the moderator may specify that songs having a "country music" genre are to be blacklisted from a playlist. Accordingly, collaborative playlist facility 112 will automatically block country music songs from being added to the playlist. If a participant requests that a country music song be added to the playlist, collaborative playlist facility 112 may automatically detect that the song is of the "country music" genre, block the song from being added to the playlist, and notify the participant that the song will not be added because country music songs are blocked from the playlist by the moderator.

As another example, the tools may allow the moderator to whitelist select songs and/or types of songs. For instance, the moderator may specify song titles, artists, ratings, genres, and/or other song attributes as criteria to be used by collaborative playlist facility 112 to determine that songs meet the criteria established by the moderator for songs to be added to the playlist. To illustrate, the moderator may specify that songs having a "rap" genre are to be allowed to be added to the playlist. Accordingly, collaborative playlist facility 112 will automatically allow rap songs to be added to the playlist. If a participant requests that a rap song be added to the playlist, collaborative playlist facility 112 may automatically detect that the song is of the "rap" genre, allow the song to be added to the playlist, and notify the participant that the song has been added to the playlist.

In this or a similar manner, the tools may allow the moderator to define one or more song parameters to be used by collaborative playlist facility 112 to govern the songs and/or types of songs that may or may not be added to a playlist. In certain embodiments, the tools may allow the moderator to define one or more song attributes as criteria for being added to the playlist by selecting and adding a song to the playlist. For example, the moderator may add a song (to which the moderator has access rights) to the playlist. In response, collaborative playlist facility 112 may automatically identify attributes of the song and thereafter use one or more of the attributes of the song as song parameters to govern what additional songs are allowed to be added to the playlist.

As another example, the tools may allow the moderator to specify that a playlist is to include a weighted mix of song genres (e.g., 25% indie rock, 50% punk rock, 25% R&B, and 25% rap), a weighted mix of music time periods (e.g., 25% of songs from the 1980s, 25% of songs from the 1990s, and 50% of songs from the 2000s), an evenly distributed mix of song attributes, and/or any other weighted mix of songs based on one or more song attributes.

As another example, the tools may allow the moderator to begin populating a playlist by manually adding one or more songs to the playlist. Collaborative playlist facility 112 may be configured to use the manually added songs to automatically further populate the playlist with one or more additional songs selected by collaborative playlist facility 112 based on attributes of the manually added songs. To illustrate, the moderator may manually add four songs from four different music genres to the playlist. Collaborative playlist facility 112 may then auto-populate the playlist with additional songs (e.g., twenty additional songs) from each of the four genres.

When a request to add a song to a playlist is received from a participant, Collaborative playlist facility 112 may be configured to use such predefined parameters to automatically and selectively add the song to the playlist or block the song from the playlist based on one or more of the parameters and on one or more attributes of the song. For instance, collaborative playlist facility 112 may automatically add the song to the playlist when an attribute of the song matches a predefined whitelist song parameter, or collaborative playlist facility 112 may automatically block the song from the playlist when an attribute of the song matches a predefined blacklist song parameter. If collaborative playlist facility 112 is unable to make a determination automatically based on predefined parameters, collaborative playlist facility 112 may revert to a default action, which may include adding the song to the playlist, blocking the song from the playlist, or notifying and prompting the moderator for user input indicting whether to add the song to the playlist or block the song from the playlist.

As another example, the tools may allow the moderator to specify one or more participation parameters to be used by collaborative playlist facility 112 to govern who is allowed or not allowed to join and participate in a playlist. For instance, the moderator may specify that all event attendees or only select event attendees (e.g., friends of the moderator) are to be allowed by collaborative playlist facility 112 to participate in the playlist. Collaborative playlist facility 112 may use the participation parameters to automatically determine to whom to send invitation messages and/or how to respond to requests from event attendees to join the playlist. Additionally or alternatively, the tools may allow the moderator to define participation parameters that assign participation levels to participants. Accordingly, collaborative playlist facility 112 may use the participation parameters to automatically determine what level of participation to grant to a participant.

As another example, the tools may allow the moderator to specify one or more invitation parameters to be used by collaborative playlist facility 112 to govern how event attendees will be allowed to join a playlist. For example, the moderator may specify that collaborative playlist facility 112 will automatically send an invitation to each media device 102 that is detected by collaborative playlist facility 112 to be connected to LAN 106 or only to select media devices 102 that are associated with certain event attendees (e.g., friends of the moderator). Additionally or alternatively, the moderator may specify what action collaborative playlist facility 112 is to take to respond to a request received from a media device 102 to join a playlist.

As another example, the tools may allow the moderator to specify one or more collaboration parameters to be used by collaborative playlist facility 112 to govern collaboration by one or more participants. For instance, the moderator may specify a maximum number of songs that may be requested and/or added to a playlist by a participant within a certain period of time, an allowable method of accessing songs requested by a particular participant (e.g., local streaming only, remote streaming only, or both local and remote streaming), and/or any other parameters to be used to govern how participants are allowed to collaboratively participate with the playlist.

In certain examples, the moderator may specify one or more collaboration parameters to be used by collaborative playlist facility 112 to allow participants to vote on requested songs to determine whether the songs will be added to and/or kept on a playlist. For instance, when a request to add a song to the playlist is received from a participant and the song is added to the playlist, collaborative playlist facility 112 may notify participants of the addition of the song to the playlist and prompt the participants to vote on whether to keep the song on the playlist. Collaborative playlist facility 112 may receive one more participant votes indicating whether to keep the song on the playlist. Collaborative playlist facility 112 may selectively play or not play the song in accordance with the playlist based on the participant votes.

In certain embodiments, for example, when votes for or against keeping the song on the playlist eclipse fifty percent of the overall votes or potential votes from the participants, collaborative playlist facility 112 will keep or remove the song on/from the playlist based on the majority vote. If the votes for or against keeping the song on the playlist do not eclipse fifty percent of the overall votes or potential votes of the participants by the time that the song is up for playback in accordance with the playlist, collaborative playlist facility 112 may be configured to play the song if the votes received include a majority in favor of keeping the song, or to not play the song (e.g., skip the song) if the votes received include a majority against keeping the song. Such voting on requested songs to determine whether the requested songs will be added to or kept on a playlist may be referred to as a "survivor" mode of operation and may provide participants with capabilities to collectively determine, by vote, which songs will be selectively added to and/or kept on the playlist.

In certain examples, the moderator may specify a minimum vote to be achieved (e.g., a minimum number of votes received) before collaborative playlist facility 112 may automatically play or skip a song. If the minimum vote is not reached by the time the song is up for playback, collaborative playlist facility 112 may default to either play or skip the song or may prompt the moderator for input to indicate whether to play or skip the song.

As another example, the tools may allow the moderator to specify one or more social interaction parameters to be used by collaborative playlist facility 112 to govern social interactions by one or more participants related to a playlist. For instance, the moderator may specify that participants are allowed to post comments about the playlist and/or songs associated with the playlist (e.g., "Best mix ever!"), to indicate whether songs associated with the playlist are liked or not liked (e.g., by indicating a "thumbs up" or a "thumbs down" for a song), to mark a song associated with the playlist as a "favorite" song, and to socially interact with one another in relation to the playlist in any other suitable way. Collaborative playlist facility 112 operating in moderator mode may be configured to host such social interactions, including by providing participants with access to comment threads and/or other social interaction messages posted by participants.

In certain examples, the tools may allow the moderator to specify and/or modify one or more collaboration parameters based on social interactions and/or other feedback provided by one or more participants in a playlist. For instance, the moderator may specify that if a predefined number or percentage of participants "dislikes" a song included in the playlist, or multiple songs included in the playlist that have similar attributes (e.g., multiple country music songs), that collaborative playlist facility 112 will extrapolate the participant feedback to apply to other songs having the same or similar attributes and automatically block such songs (e.g., songs of the same genre, artist, etc.) from being added to the playlist in the future. For example, if sufficient negative feedback is received for one or more country music songs, collaborative playlist facility 112 may block other country music songs from being added to the playlist. Collaborative playlist facility 112 may also be configured to remove other country music songs from the playlist. Collaborative playlist facility 112 may block country music songs from being added to the playlist in any suitable way, including by modifying one or more blacklist parameters to specify that country music is to be blocked from the playlist.

As another example, the tools may allow the moderator to specify one or more post-event parameters to be use by collaborative playlist facility 112 to perform one or more operations after conclusion of an event. For instance, the moderator may specify that certain information about or related to a playlist is to be published for broader access after the event. To illustrate, information descriptive of the playlist, collaborations related to the playlist, social interactions related to the playlist, playlist participants, and/or any other information about the playlist may be made available for broader access after the event such as by collaborative playlist facility 112 publishing the information to a server device for access by way of a wide area network. For example, the information may be published to a website and/or webpage for access by way of the World Wide Web. Accordingly, the published information may be made accessible to participants in the playlist and/or to other people. The published information may be used by a person accessing the information to find additional information about songs included in the playlist, purchase songs included in the playlist, create a new collaborative event playlist based on the playlist, and/or for any other suitable purpose.

To illustrate one possible use of a published playlist, a user may access the playlist such as by downloading data representative of the playlist to a media device 102 implementing collaborative playlist facility 112. The user may use the playlist as a launch point from which to create a new collaborative event playlist for playback at another event. For example, the user may create the new playlist by manually modifying the downloaded playlist by removing, adding, and/or rearranging songs in the playlist. The user may define one or more parameters for the new playlist in any of the ways described above.

The new playlist may then be hosted for playback at the other event. At the beginning of or during the event, collaborative playlist facility 112 may scan and determine the participants at the event who have joined the new playlist. Collaborative playlist facility 112 may compare the participants against the songs included in the new playlist. If a song included in the new playlist was previously provided to the old playlist by a participant who has not joined the new playlist (e.g., a person is not at the other event), collaborative playlist facility 112 may identify the song as a missing song and perform one or more actions. For example, collaborative playlist facility 112 may remove the missing song from the new playlist, replace the missing song with a similar song (a song having matching attributes) to which a participant in the new playlist has access rights, provide an option for a participant in or moderator of the new playlist to purchase access rights to the missing song (e.g., through a music store or other music distribution channel accessible by a media device 102 associated with the participant or moderator), or send a notification to participants in the new playlist prompting the participants to indicate if they have access rights to the missing song (e.g., a different participant may have the missing song in his or her music library).

With respect to a participant participating in a playlist hosted by a moderator device, the tools provided by collaborative playlist facility 112 implemented by a participant device may include tools for use by a participant to participate in the playlist. For example, the tools may allow the participant to access and view information about the playlist, which information may indicate songs included in the playlist, predefined parameters associated with the playlist (e.g., parameters specifying which types of songs are allowed or not allowed on the playlist), participants who have joined the playlist, song information for songs associated with the playlist (e.g., song metadata, song purchase information, artist information (e.g., artist bios), concert information for an artist, entertainment news about the artist, pictures and/or discography related to a song or artist, information about songs that are similar to a song included in the playlist, and any other information related to the playlist. The participant may use the information about the playlist as a launch point to obtain additional information, to obtain access rights to songs (e.g., by purchasing the songs), to create a new playlist, and/or for any other suitable action.

The tools may further allow the participant to provide comments and/or feedback about the playlist and/or songs in the playlist, to mark a song in the playlist as being of interest, to seek for additional information about songs in the playlist, to purchase or otherwise obtain access rights for songs in the playlist, to create a new user-specific playlist based on the collaborative event playlist and/or one or more songs in the collaborative event playlist, and to perform one or more other actions in relation to the playlist.

The tools may further allow the participant to collaborate to populate the collaborative event playlist in any of the ways described herein. For example, the tools may allow the participant to submit a request for a song to be added to the playlist as described herein. As another example, the tools may allow the participant to vote as to whether to keep a song on the playlist or to remove a song from the playlist as described herein.

Additionally or alternatively, the tools may allow the participant to interact with the playlist in any other way. For example, the tools may allow the participant to sign a guest book associated with the playlist and/or the event.

In any of the ways described herein, system 100 may provide an ad hoc social network centered on a collaborative event playlist that is collaboratively populated by event attendees for playback at an event. Accordingly, system 100 may provide a collaborative and/or social experience that is centered on a collaborative event playlist.

The tools may allow a moderator who creates a playlist to define one or more parameters that may be used by a moderator device to automatically populate a playlist based on the parameters and on attributes of songs associated with event attendees (e.g., songs included in personal music libraries of event attendees). For example, a moderator may define a vibe parameter of a playlist to specify that the vibe of the playlist is to be a "west coast 1990's gangster rap" vibe. Thereafter, the moderator device may search for available songs that match this vibe and automatically add any such songs to the playlist for playback at an event. For instance, the moderator device may communicate with one or more participant devices located at an event premises as described herein to access information about music libraries associated with the participant devices and to use the information to identify songs that match the defined vibe of the playlist. Moderator device may add any such identified songs to the playlist.

To illustrate, during an event, moderator device 404 may communicate with participant devices 502 to identify any songs associated with participant devices 502 that have attributes that match with the selected "west coast 1990's gangster rap" vibe. A match may be identified using any suitable predefined criteria, such as tempo, mood, date of release, artist, and/or any other criteria. Moderator device 404 may add identified matching songs to playlist 408 for playback at the event as described here. In certain embodiments, moderator device 404 may perform these operations in full automation with minimal or no user input. Accordingly, a playlist may be automatically created, using songs associated with event attendees, to fit a predefined vibe and/or other predefined parameter(s).

In certain embodiments, a moderator may define playlist parameters such that moderator device will automatically select a vibe and/or other parameter of the playlist based on songs included in music libraries associated with event attendees. For example, a moderator device may communicate with participant devices located at an event premises to obtain information about songs included in music libraries associated with the participant devices. Moderator device may analyze the information to identify attributes of the songs as a whole. For instance, the moderator device may determine that a majority of the participant devices are each associated with a certain song, artist, genre, and/or other song parameter. Based on this identified content overlap between participant devices, the moderator device may automatically select and add songs associated with the overlapping content to the playlist.

To illustrate, during an event, moderator device 404 may determine that a majority of participant devices 502 are associated with music libraries that contain songs of a "1980's rock n' roll" genre. Moderator device 404 may select and add songs of this genre to playlist 408 for playback at the event based on the ascertained collective popularity of this genre of songs among event attendees.

In certain examples, a determined collective popularity of songs having certain attributes by a moderator device may be allowed to override a predefined vibe of a playlist. For example, a moderator may create a playlist to have a "west coast 1990's gangster rap" vibe. During an event, a moderator device creating the playlist may determine that a majority of participate devices located at the event have overlapping content of a different vibe. For instance, fifteen out of twenty-six event attendees may be associated with music libraries that contain songs by artist Celine Dion. The moderator device may allow the collective popularity of the Celine Dion songs to overrule the predefined "west coast 1990's gangster rap" vibe of the playlist. Such a democratic majority rule may allow the moderator device to automatically create a playlist that is based on the personal music libraries of event attendees. The moderator device may automatically change the vibe and/or other attributes of songs added to the playlist as event attendees come and go at the event and the attributes of the event attendees' music libraries change over time during the event. In this or a similar manner, the moderator device may create a playlist that provides a vibe and/or other parameters that are based on the music libraries associated with current event attendees.

In certain examples, a moderator device may provide a moderator with a user interface having one or more tools to allow the moderator to provide user input that may modify the automatic population of a playlist by the moderator device. For example, the moderator device may provide an editorial console that allows the moderator to filter songs in and/or out of a playlist, such as by manually selecting songs to be filtered in/out and/or selecting attributes (e.g., genre, artist, etc.) of songs to be filtered in/out of the playlist.

A moderator device may provide a playlist moderator with one or more tools that may be used to define a desired level of automation for creation of a playlist during an event. Thus, the moderator may determine whether the moderator device will populate the playlist in fully automated mode based on event attendees' music libraries, manual mode based on requests from participants to add songs to the playlist, or in a hybrid mode that uses automation and manual user input to populate the playlist.

Figure 9:
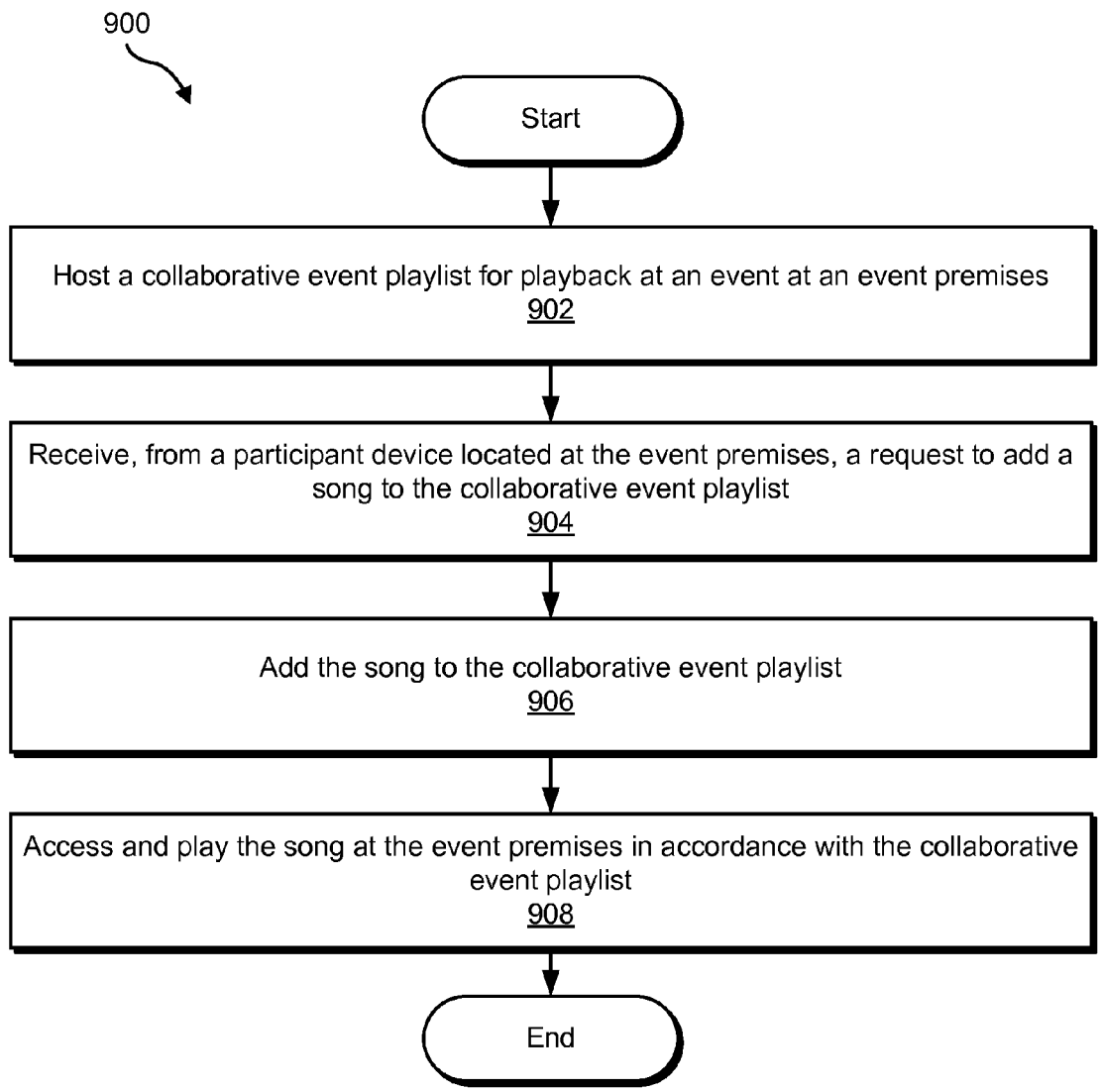
FIG. 9 illustrates an exemplary collaborative event playlist method according to principles described herein.

FIG. 9 illustrates an exemplary collaborative event playlist method 900. While FIG. 9 illustrates exemplary steps according to one embodiment, other embodiments may omit, add to, reorder, combine, and/or modify any of the steps shown in FIG. 9. One or more of the steps shown in FIG. 9 may be performed by a collaborative playlist facility 112 and/or a media device 102 implementing the collaborative playlist facility 112.

In step 902, a moderator device hosts a collaborative event playlist for playback at an event at an event premises. Step 902 may be performed in any of the ways described herein.

In step 904, the moderator device receives, from a participant device located at the event premises, a request to add a song to the collaborative event playlist. Step 904 may be performed in any of the ways described herein.

In step 906, the moderator device adds the song to the collaborative event playlist. Step 906 may be performed in any of the ways described herein, including by the moderator device automatically adding the song to the playlist based on one or more predefined parameters for the playlist and/or in response to user input provided by a moderator to instruct the moderator device to add the song to the playlist.

In step 908, the moderator device accesses and plays the song at the event premises in accordance with the collaborative event playlist. Step 908 may be performed in any of the ways described herein.

One or more steps of the method 900 may be repeated by the moderator device to collaboratively add one or more additional songs to the collaborative event playlist for access and playback at the event. For example, steps 904-908 may be repeated by the moderator device to receive, from the same or an additional participant device located at the event premises, a request to add an additional song to the collaborative event playlist, to add the additional song to the collaborative event playlist, and to access and play the additional song at the event premises in accordance with the collaborative event playlist.

Figure 10:
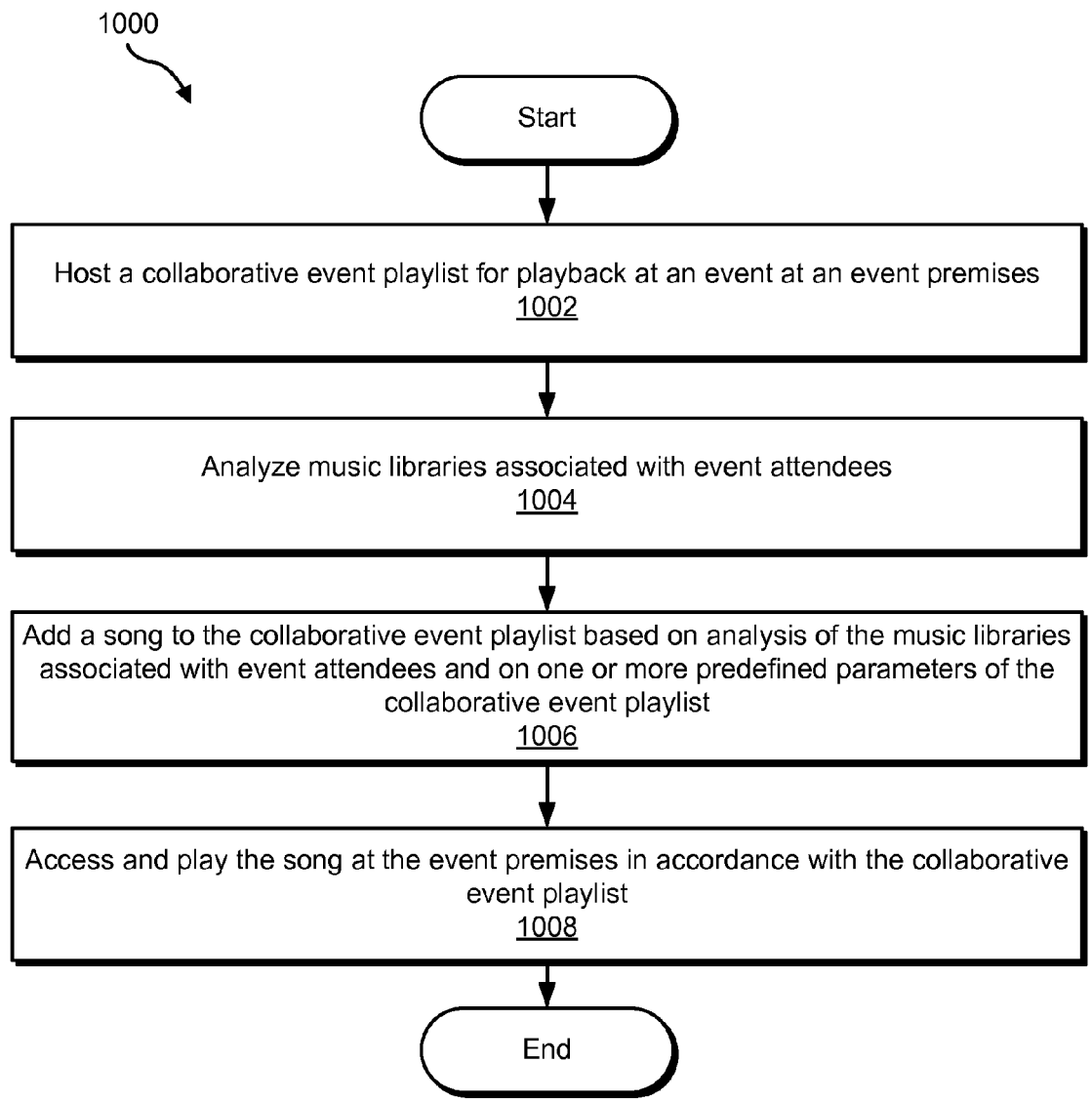
FIG. 10 illustrates another exemplary collaborative event playlist method according to principles described herein.

FIG. 10 illustrates another exemplary collaborative event playlist method 1000. While FIG. 10 illustrates exemplary steps according to one embodiment, other embodiments may omit, add to, reorder, combine, and/or modify any of the steps shown in FIG. 10. One or more of the steps shown in FIG. 10 may be performed by a collaborative playlist facility 112 and/or a media device 102 implementing the collaborative playlist facility 112.

In step 1002, a moderator device hosts a collaborative event playlist for playback at an event at an event premises. Step 1002 may be performed in any of the ways described herein.

In step 1004, the moderator device analyzes music libraries associated with event attendees. Step 1004 may be performed in any of the ways described herein.

In step 1006, the moderator device adds a song to the collaborative event playlist based on the analysis of the music libraries associated with the event attendees and on one or more predefined parameters of the collaborative event playlist. Step 1006 may be performed in any of the ways described herein.

In step 1008, the moderator device accesses and plays the song at the event premises in accordance with the collaborative event playlist. Step 1008 may be performed in any of the ways described herein.

One or more steps of the method 1000 may be repeated by the moderator device to collaboratively add one or more additional songs to the collaborative event playlist for access and playback at the event. For example, steps 1004-1008 may be repeated by the moderator device to add an additional song to the collaborative event playlist, and to access and play the additional song at the event premises in accordance with the collaborative event playlist.

In certain examples, steps 1002-1008 may be performed automatically by a moderator device, with little or no user input.

In certain embodiments, one or more of the processes described herein may be implemented at least in part as instructions embodied in a non- transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 11:
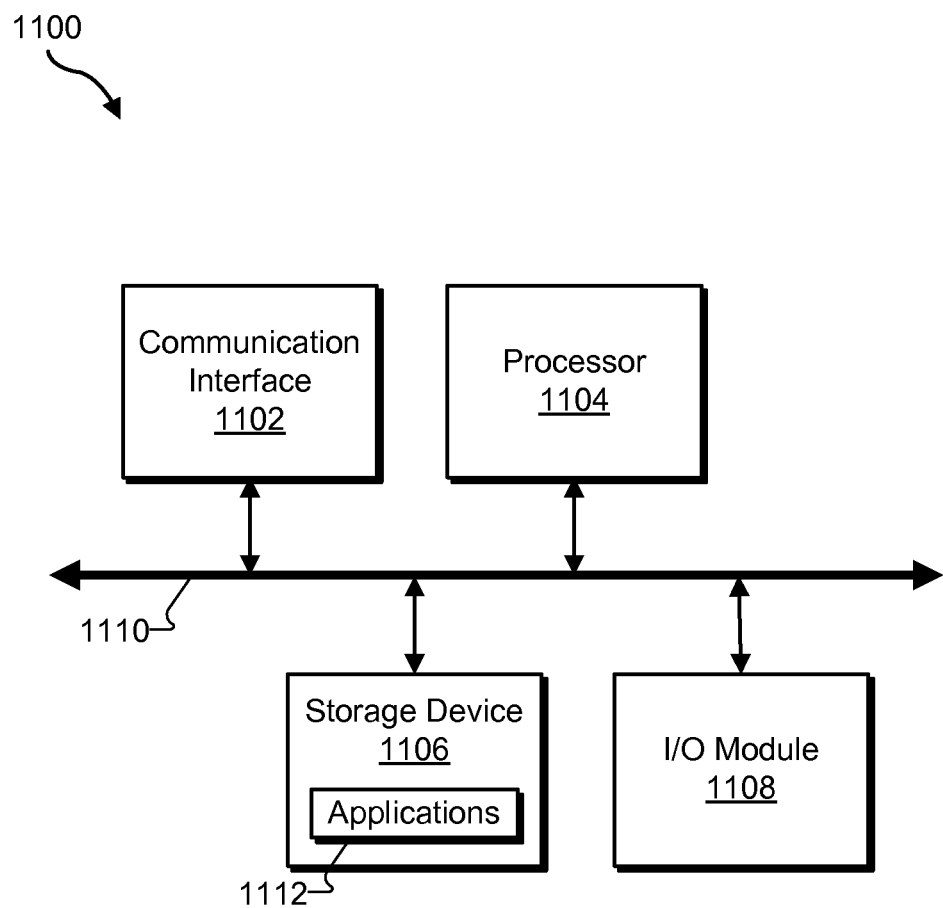
FIG. 11 illustrates an exemplary computing device according to principles described herein.

FIG. 11 illustrates an exemplary computing device 1100 that may be configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting.

Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, and any other suitable interface.

Processor 1104 generally represents any type or form of processing unit capable of processing data or interpreting, executing, and/or directing execution of one or more of the instructions, processes, and/or operations described herein. Processor 1104 may execute and/or direct execution of operations as directed by one or more applications 1112 (which may include collaborative playlist facility 112) or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may be configured to receive user input and provide user output and may include any hardware, firmware, software, or combination thereof supportive of input and output capabilities. For example, I/O module 1108 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1108 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
    a moderator device located at an event premises, connected to a local area network at the event premises, and hosting a collaborative event playlist for playback at an event at the event premises; and
    a plurality of participant devices located at the event premises, connected to the local area network at the event premises, and configured to communicate with the moderator device by way of the local area network to participate in populating the collaborative event playlist with a plurality of songs to which at least one of the plurality of participant devices has access rights;
    wherein the moderator device:
        provides a user interface for display on a display screen of the moderator device;
        receives, when the collaborative event playlist is created, a user input that is entered by way of the user interface by a moderator of the collaborative event playlist and that selects a first set of parameters for the collaborative event playlist, the first set of parameters specifying types of songs that are blacklisted from being added to the collaborative event playlist;
        defines, based on data received from the plurality of participant devices that includes attributes of the plurality of songs to which the at least one of the plurality of participant devices has access rights, a second set of parameters for the collaborative event playlist, the second set of parameters indicative of a collective popularity of songs to which the plurality of participant devices have access rights;
        populates, based on both the first set of parameters selected by the moderator and the second set of parameters that are indicative of the collective popularity of the songs, the collaborative event playlist with songs included in the plurality of songs;
        sends, as the plurality of participant devices connected to the local area network changes when users of the plurality of participant devices come and go from the event premises during the live event, an invitation message to one or more of the plurality of participant devices to invite the one or more of the plurality of participant devices to participate in the collaborative event playlist;
        determines, as the plurality of participant devices connected to the local area network changes when the users of the plurality of participant devices come and go from the event premises during the event and based on additional data received from the one or more of the plurality of participant devices, that a plurality of music libraries associated with the plurality of participant devices include at least a majority of songs associated with an additional set of parameters that is different from the first set of parameters;
        automatically changes or overrides the first set of parameters for the collaborative event playlist based on the additional set of parameters; and
        populates, based on the additional set of parameters, the collaborative event playlist with additional songs included in the plurality of songs that, before the automatically changing or overriding of the first set of parameters, were blacklisted and would not have been allowed, by the moderator device, to be added to the collaborative event playlist.

2. The system of claim 1, wherein the moderator device and a participant device included in the plurality of participant devices are associated with different users attending the event at the event premises.

3. The system of claim 2, wherein:
the moderator device is operated by the moderator of the collaborative event playlist; and
the participant device is operated by a participant in the populating of the collaborative event playlist.

4. The system of claim 3, wherein:
the participant device has access to a personal music library of the participant; and
a song included in the plurality of songs is included in the personal music library of the participant.

5. The system of claim 4, wherein the personal music library of the participant is stored at least one of by the participant device in local memory and by an online media content hosting server device accessible by the participant device by way of a wide area network.

6. The system of claim 1, wherein the moderator device:
accesses and plays a song included in the plurality of songs at the event in accordance with the collaborative event playlist.

7. The system of claim 6, wherein the moderator device leverages the access rights of a participant device included in the plurality of participant devices to access and play the song at the event in accordance with the collaborative event playlist.

8. The system of claim 6, wherein the moderator device accesses the song by receiving information associated with the song from a participant device included in the plurality of participant devices by way of the local area network and using the information to request and receive a stream carrying data representative of the song from a media content server device by way of a wide area network.

9. The system of claim 6, wherein the moderator device accesses the song by receiving a stream carrying the song from a participant device included in the plurality of participant devices by way of the local area network.

10. The system of claim 6, wherein the moderator device accesses the song by obtaining a temporary copy of the entire song in advance of the moderator device initiating playback of the song at the event.

11. The system of claim 1, wherein:
the event comprises a party;
the event premises comprises a physical premises at which the party is hosted;
the local area network comprises a Wi-Fi network; and
the plurality of participant devices comprise mobile devices of the users attending the party.

12. The system of claim 1, wherein the moderator device:
notifies one or more participants of an addition of a song included in the plurality of songs to the collaborative event playlist;
receives one or more participant votes provided by the one or more participants and indicating whether to keep the song on the collaborative event playlist; and
selectively plays or does not play the song at the event in accordance with the collaborative event playlist based on the one or more participant votes.

13. The system of claim 1, wherein the moderator device:
receives feedback about a song included in the plurality of songs from one or more participants; and
modifies one or more parameters included in the set of parameters or in the additional set of parameters for the collaborative event playlist based on the feedback.

14. The system of claim 1, wherein after the event ends the moderator device publishes information about the collaborative event playlist to a server device accessible by way of a wide area network.

15. The system of claim 1, wherein the moderator device further sends together with the invitation message an invitation for the one or more of the plurality of participant devices to download and install a collaborative playlist application on the one or more of the plurality of participant devices.

16. The system of claim 1, wherein the moderator device further determines a predefined participation level for the users associated with the one or more of the plurality of participant devices, the predefined participation level including the users associated with the one or more of the plurality of participant devices being authorized to participate in the collaborative event playlist as one of collaborative participants and non-collaborative participants.

17. A system comprising:
a processor; and
a collaborative playlist facility that directs the processor to:
host a collaborative event playlist for playback at an event at an event premises;
provide a user interface for display on a display screen of a moderator device;
receive, when the collaborative event playlist is created, a user input that is entered by way of the user interface by a moderator of the collaborative event playlist and that selects a first set of parameters for the collaborative event playlist, the user input provided by a moderator of the collaborative event playlist, and the first set of parameters specifying types of songs that are blacklisted from being added to the collaborative event playlist;
define, based on data received from a plurality of participant devices that includes attributes of a plurality of songs to which at least one of the plurality of participant devices has access rights, a second set of parameters for the collaborative event playlist, the second set of parameters indicative of a collective popularity of songs to which the plurality of participant devices have access rights;
populate, based on both the first set of parameters selected by the moderator and the second set of parameters that are indicative of the collective popularity of the songs, the collaborative event playlist with songs included in the plurality of songs;
leverage the access rights of a participant device included in the plurality of participant devices to access and play a song included in the plurality of songs at the event in accordance with the collaborative event playlist after the song is populated in the collaborative event playlist;
send, as the plurality of participant devices connected to a local area network changes when users of the plurality of participant devices come and go from the event premises during the live event, an invitation message to one or more of the plurality of participant devices to invite the one or more of the plurality of participant devices to participate in the collaborative event playlist;
determine, as the plurality of participant devices connected to the local area network at the event premises changes when the users of the plurality of participant devices come and go from the event premises during the event and based on additional data received from the one or more of the plurality of participant devices, that a plurality of music libraries associated with the plurality of participant devices include at least a majority of songs associated with an additional set of parameters that is different from the first set of parameters;

automatically change or override the first set of parameters for the collaborative event playlist based on the additional set of parameters; and populate, based on the additional set of parameters, the collaborative event playlist with additional songs that, before the automatically changing or overriding of the first set of parameters, were blacklisted and would not have been allowed, by the moderator device, to be added to the collaborative event playlist.

18. The system of claim 17, wherein the collaborative playlist facility directs the processor to access the song by requesting and receiving information associated with the song from the participant device by way of the local area network and using the information to request and receive a stream carrying data representative of the song from a media content server device by way of a wide area network.

19. The system of claim 18, wherein the media content server device stores data representative of a personal music library of a user of the participant device, the personal music library containing the song.

20. The system of claim 17, wherein the collaborative playlist facility directs the processor to access the song by requesting and receiving a stream carrying the song from the participant device by way of the local area network.

21. The system of claim 20, wherein the participant device stores data representative of a personal music library of a user of the participant device, the personal music library containing the song.

22. The system of claim 17, wherein the collaborative playlist facility directs the processor to access the song by obtaining a temporary copy of the entire song in advance of the collaborative playlist facility directing the processor to initiate playback of the song at the event.

23. A method comprising:

hosting, by a moderator device located at an event premises, a collaborative event playlist for playback at an event at the event premises;

providing, by the moderator device, a user interface for display on a display screen of the moderator device;

receiving, by the moderator device when the collaborative event playlist is created, a user input that is entered by way of the user interface by a moderator of the collaborative event playlist and that selects a first set of parameters for the collaborative event playlist, the first set of parameters specifying types of songs that are blacklisted from being added to the collaborative event playlist;

defining, by the moderator device based on data received from a plurality of participant devices that includes attributes of a plurality of songs to which at least one of the plurality of participant devices has access rights, a second set of parameters for the collaborative event playlist, the second set of parameters indicative of a collective popularity of songs to which the plurality of participant devices have access rights;

populating, by the moderator device based on both the first set of parameters selected by the moderator and the second set of parameters that are indicative of the collective popularity of the songs, the collaborative event playlist with one or more songs included in a plurality of songs to which a plurality of participant devices located at the event premises have access rights;

leveraging, by the moderator device, the access rights of a participant device included in the plurality of participant devices to access and play a song included in the one or more songs at the event in accordance with the collaborative event playlist;

sending, by the moderator device as the plurality of participant devices connected to a local area network changes when users of the plurality of participant devices come and go from the event premises during the live event, an invitation message to one or more of the plurality of participant devices to invite the one or more of the plurality of participant devices to participate in the collaborative event playlist;

determining, by the moderator device as the plurality of participant devices connected to the local area network at the event premises changes when the users of the plurality of participant devices come and go from the event premises during the event and based on additional data received from the one or more of the plurality of participant devices, that a plurality of music libraries associated with the plurality of participant devices include at least a majority of songs associated with an additional set of parameters that is different from the first set of parameters;

automatically changing or overriding, by the moderator device, the first set of parameters for the collaborative event playlist based on the additional set of parameters; and populating, by the moderator device based on the additional set of parameters, the collaborative event playlist with one or more additional songs included in the plurality of songs that, before the automatically changing or overriding of the first set of parameters, were blacklisted and would not have been allowed, by the moderator device, to be added to the collaborative event playlist.

24. A method comprising:

hosting, by a moderator device located at an event premises, a collaborative event playlist for playback at an event at the event premises;

providing, by the moderator device, a user interface for display on a display screen of the moderator device;

receiving, by the moderator device when the collaborative event playlist is created, a user input that is entered by way of the user interface by a moderator of the collaborative event playlist and that selects a first set of parameters for the collaborative event playlist, the first set of parameters specifying types of songs that are blacklisted from being added to the collaborative event playlist;

defining, by the moderator device based on data received from a plurality of participant devices that includes attributes of a plurality of songs to which at least one of the plurality of participant devices has access rights, a second set of parameters for the collaborative event playlist, the second set of parameters indicative of a collective popularity of songs to which the plurality of participant devices have access rights;

analyzing, by the moderator device, a plurality of music libraries associated with a plurality of event attendees;

populating, by the moderator device based on the analyzing of the plurality of music libraries associated with the plurality of event attendees and on both the first set of parameters selected by the moderator and the second set of parameters that are indicative of the collective popularity of the songs, the collaborative event playlist with a song included in the plurality of music libraries;

accessing and playing the song at the event premises in accordance with the collaborative event playlist;

sending, by the moderator device as the plurality of participant devices connected to a local area network changes when the plurality of attendees that are associated with the plurality of participant devices come and go from the event premises during the live event, an invitation message to one or more of the plurality of participant devices to invite the one or more of the plurality of participant devices to participate in the collaborative event playlist;

determining, by the moderator device as the plurality of participant devices connected to the local area network changes when the plurality of attendees that are associated with the plurality of participant devices come and go from the event premises during the event and based on additional data received from the one or more of the plurality of participant devices, that the plurality of music libraries associated with the plurality of attendees include at least a majority of songs associated with an additional set of parameters that is different from the first set of parameters;

automatically changing or overriding, by the moderator device, the first set of parameters for the collaborative event playlist based on the additional set of parameters; and populating, by the moderator device and based on the analyzing of the plurality of music libraries associated with the plurality of attendees and on the additional set of parameters, the collaborative event playlist with an additional song that is included in the plurality of music libraries and that, before the automatically changing or overriding of the first set of parameters, were blacklisted and would not have been allowed, by the moderator device, to be added to the collaborative event playlist.

\* \* \* \* \*